(12) United States Patent
Sanders

(10) Patent No.: US 9,724,873 B2
(45) Date of Patent: Aug. 8, 2017

(54) PIPE-LINER EVERSION SYSTEM AND METHOD

(71) Applicant: Simon Sanders, Salisbury (GB)

(72) Inventor: Simon Sanders, Salisbury (GB)

( * ) Notice: Subject to any disclaimer, the term of this patent is extended or adjusted under 35 U.S.C. 154(b) by 359 days.

(21) Appl. No.: 14/615,056

(22) Filed: Feb. 5, 2015

(65) Prior Publication Data

US 2015/0151484 A1    Jun. 4, 2015

Related U.S. Application Data

(63) Continuation-in-part of application No. 13/140,760, filed as application No. PCT/GB2009/002922 on Dec. 21, 2009, now abandoned.

(30) Foreign Application Priority Data

Dec. 19, 2008 (GB) .................................. 0823174.8
Jul. 30, 2009 (GB) .................................. 0913281.2

(51) Int. Cl.
*E04B 2/00* (2006.01)
*E04F 13/00* (2006.01)
(Continued)

(52) U.S. Cl.
CPC .......... *B29C 63/36* (2013.01); *F16L 55/1651* (2013.01); *F16L 55/18* (2013.01); *B29C 65/483* (2013.01); *B29C 66/004* (2013.01); *B29C 66/005* (2013.01); *B29C 66/5221* (2013.01); *B29C 66/612* (2013.01); *B29C 66/632* (2013.01)

(58) Field of Classification Search
CPC ......... B29C 63/34; B29C 63/36; B29C 65/00; B29C 65/48; B29C 65/483; B29C 65/4835; B29C 66/00; B29C 66/004; B29C 66/005; B29C 66/5221; B29C 66/5227; B29C 66/52271; B29C 66/52272; B29C 66/612; B29C 66/632; B29C 66/634; F16L 55/1651; F16L 55/18; F16L 55/1656; F16L 55/179
USPC ..... 156/60, 71, 94, 156, 160, 229, 293, 294, 156/296, 304.1, 304.2, 307.1, 307.3, 701;
(Continued)

(56) References Cited

U.S. PATENT DOCUMENTS 5,044,405 A * 9/1991 Driver ................. F16L 55/1651
138/98
5,407,630 A * 4/1995 Smith ................. B29C 47/0004
156/287

(Continued)

*Primary Examiner* — Philip Tucker
*Assistant Examiner* — Brian R Slawski

(57) ABSTRACT

A pipe-liner system for use when lining a pipe interior features a pipe having a pipe opening end and a pipe interior wall. The system features a flexible, substantially-impermeable, elongate extender-tube and an evertable, flexible, elongate, tubular pipe-liner. The system features a substantially leak-proof pressure retaining closure-sleeve located on a pipe-liner second end. An extender-tube second end is attached to a pipe-liner first end via a substantially leak-proof connection there between. The combined extender-tube and the pipe-liner form a single continuous evertable tube, hereinafter referred to as an extended liner having the pressure retaining closure-sleeve enclosing an extended liner distal end. A length of the extender-tube and a length of the pipe-liner are each chosen so that the liner is caused to be accurately positioned within the pipe upon eversion.

8 Claims, 12 Drawing Sheets

(51) Int. Cl.

| | | |
|---|---|---|
| | *B29C 73/00* | (2006.01) |
| | *B32B 43/00* | (2006.01) |
| | *B65C 3/26* | (2006.01) |
| | *B29C 65/00* | (2006.01) |
| | *B32B 37/00* | (2006.01) |
| | *C09J 5/00* | (2006.01) |
| | *B29C 63/00* | (2006.01) |
| | *F16L 55/16* | (2006.01) |
| | *B29D 24/00* | (2006.01) |
| | *B28B 19/00* | (2006.01) |
| | *B29C 45/14* | (2006.01) |
| | *F16L 55/18* | (2006.01) |
| | *B29C 63/36* | (2006.01) |
| | *F16L 55/165* | (2006.01) |
| | *B29C 65/48* | (2006.01) |

(58) Field of Classification Search
USPC ............. 138/97, 98; 264/36.17, 269, 516; 405/150.1, 184.2
See application file for complete search history.

(56) References Cited

U.S. PATENT DOCUMENTS

| | | |
|---|---|---|
| 5,964,249 A | 10/1999 | Kiest |
| 6,199,591 B1 | 3/2001 | Kiest et al. |
| 2006/0130922 A1 | 6/2006 | Kamiyama et al. |
| 2008/0169036 A1 | 7/2008 | Kamiyama et al. |
| 2008/0236692 A1 | 10/2008 | Kiest |

\* cited by examiner

PIPE-LINER EVERSION SYSTEM AND METHOD

CROSS REFERENCE

This application claims priority to U.S. patent application Ser. No. 13/140,760 filed Jun. 17, 2011 which is a continuation-in-part, claims priority to PCT/GB2009/002922 filed Dec. 21, 2009, claims priority to Foreign Application No. GB 0823174.8 filed Dec. 19, 2008, and claims priority to Foreign Application No. GB 0913281.2 filed Jul. 30, 2009, the specification(s) of which is/are incorporated herein in their entirety by reference.

FIELD OF THE INVENTION

The present invention relates to pipe-liners, pipe-liner systems, and pipe-liner methods.

BACKGROUND OF THE INVENTION

The present invention addresses a substantial improvement in the field of pipe repair by successfully addressing the difficulty with accessing and repairing a damaged pipe. Pipes are often installed underground or in areas where access can be difficult. Even though a pipe installation may last for many years, sometimes it is necessary to repair the pipe installation due many factors, including earthquakes, corrosion, impact, tree root damage, leaking, or other factors. In certain cases, the damaged pipe can be lined with a durable liner, thus prolonging the life of the installation by many years, however, installing the liner can be difficult due to the limited availability for sufficient access. The present invention features a pipe-liner system for use when lining a pipe interior.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a pipe-liner system for use when lining a pipe interior. In some embodiments, the system comprises a pipe having a pipe opening end and a pipe interior wall.

In some embodiments, the system comprises a flexible, substantially-impermeable, elongate extender-tube having an extender-tube first end and an extender-tube second end. In some embodiments, an extender-tube length is measured from the extender-tube first end to the extender-tube second end.

In some embodiments, the system comprises an evertable, flexible, elongate, tubular pipe-liner having a pipe-liner first end and a pipe-liner second end. In some embodiments, a pipe-liner length is measured from the pipe-liner first end to the pipe-liner second end.

In some embodiments, the system comprises a substantially leak-proof pressure retaining closure-sleeve located on the pipe-liner second end.

In some embodiments, the extender-tube second end is located onto the pipe-liner first end via a substantially leak-proof connection there between. In some embodiments, the combined extender-tube and the pipe-liner form a single continuous evertable tube, hereinafter referred to as an extended liner having the pressure retaining closure-sleeve enclosing a distal end of the pipe-liner, which is a distal end of the extended liner.

In some embodiments, a length of the extender-tube and a length of the pipe-liner are each chosen so that the liner is caused to be accurately positioned within the pipe upon eversion.

In some embodiments, for installation, a first end of the extender-tube which is a proximal end of the extended liner is located at a predetermined position within the pipe from the pipe opening end.

In some embodiments, the combined extender-tube and pipe-liner are everted via fluid under pressure that has been introduced into an interior of the extended liner to drive at least part of the eversion process progressively so that the extender-tube is first to evert and drags the pipe-liner through the extender-tube, and so that the pipe-liner then everts after the eversion of the extender-tube is completed, so that the pipe-liner becomes positioned at a desired position in the pipe being lined via the predetermined length of the extender-tube, the predetermined length of the pipe-liner, and the everting of the proximal end of the liner at the predetermined position within the pipe from the pipe end, detaching the extender-tube from the pipe-liner and removing the extender-tube from the pipe being lined.

DESCRIPTION OF PREFERRED EMBODIMENTS

Figure 1:
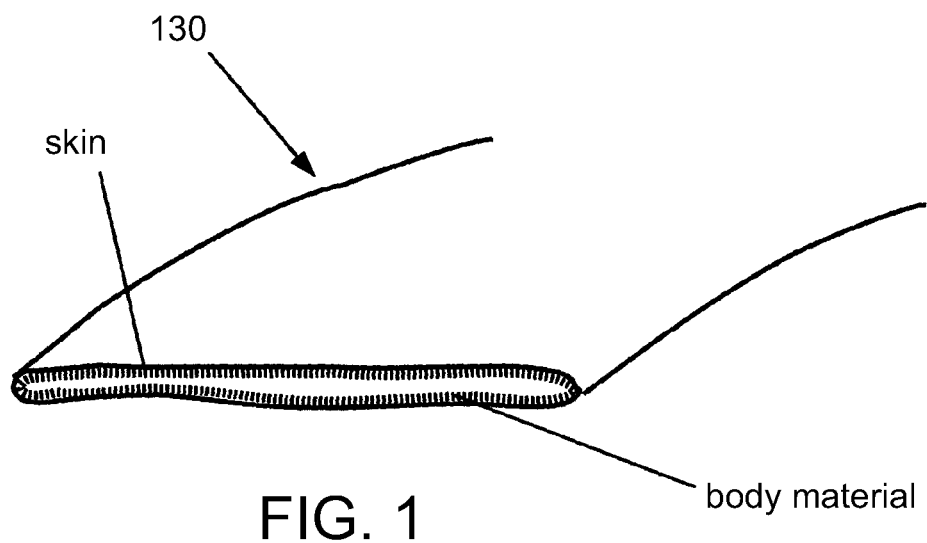
FIG. 1 shows a view of pipe-liner of the present invention before eversion.
Figure 2:
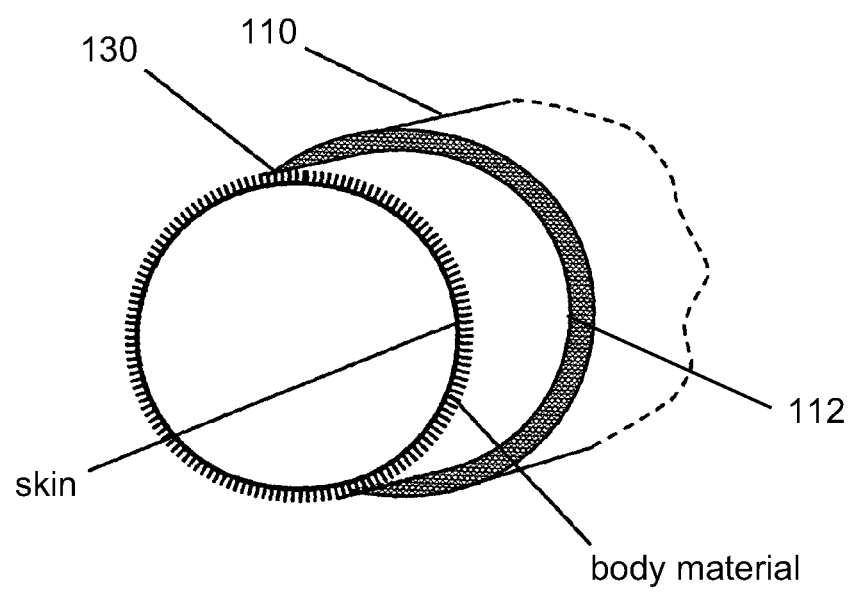
FIG. 2 shows a view of a pipe-liner of the present invention that has been everted through and out from a pipe.
Figure 3:
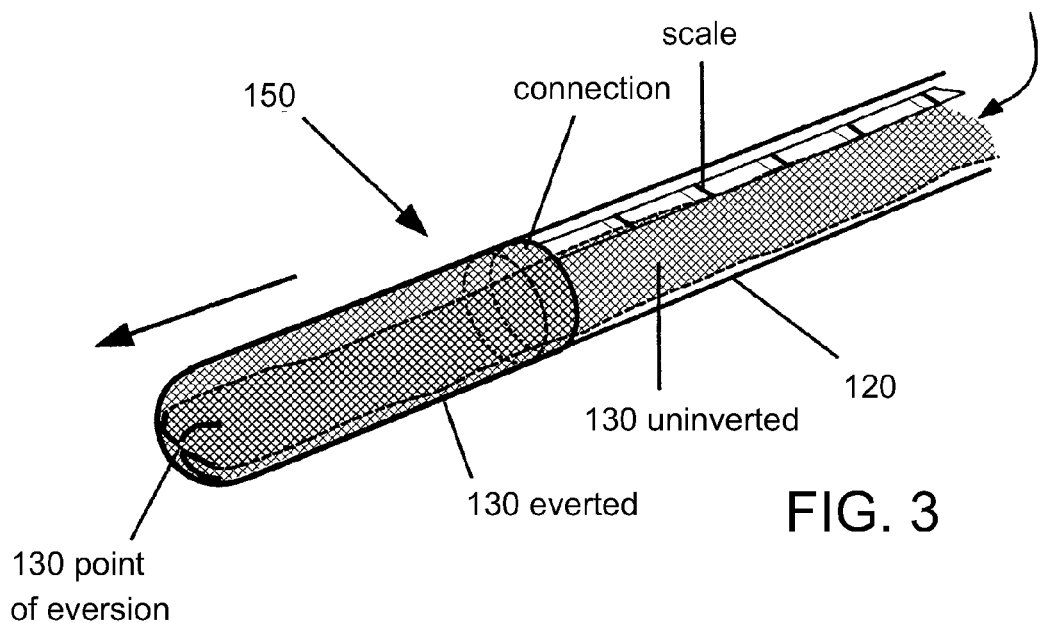
FIG. 3 shows an extended liner of the present invention during eversion.
Figure 4:
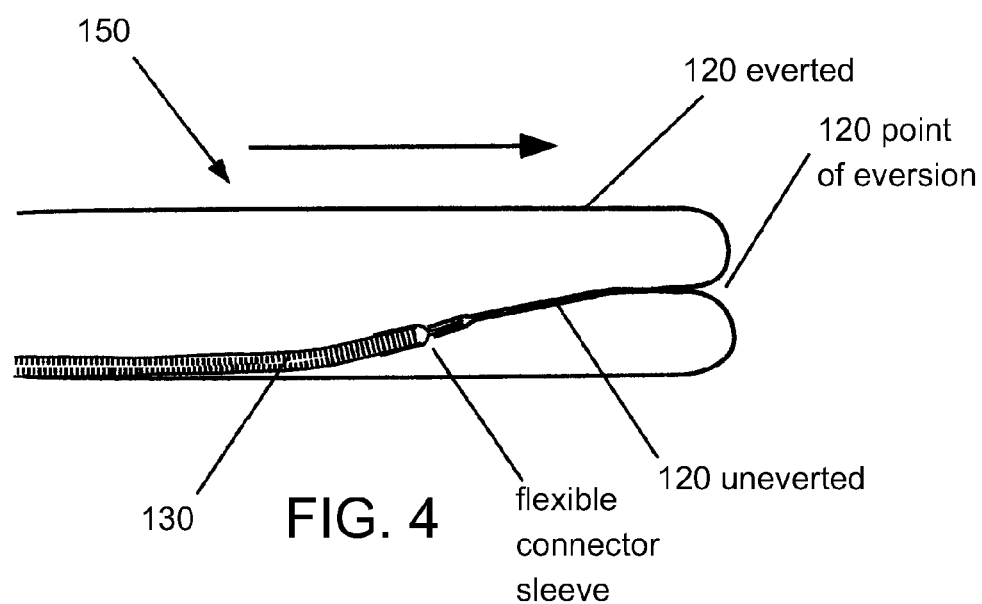
FIG. 4 shows a longitudinal sectional view of the extended liner of the present invention during eversion.

Following is a list of elements corresponding to a particular element referred to herein:
100 Pipe-liner system
110 Pipe
112 Pipe opening end
114 Pipe interior wall
116 Pipe interior cavity
120 Extender-tube
122 Extender-tube first end
124 Extender-tube second end
130 Pipe-liner
132 Pipe-liner first end
134 Pipe-liner second end
140 Closure-sleeve
150 Extended liner Referring now to FIG. 1-23, the present invention features a pipe-liner system (100) for use when lining a pipe interior wall. In some embodiments, the system (100) comprises a pipe (110) having a pipe opening end (112) fluidly connected to a pipe interior wall (114).

In some embodiments, the system (100) comprises a flexible, substantially-impermeable, elongate, extender-tube (120) having an extender-tube first end (122) and an extender-tube second end (124). In some embodiments, a selectable extender-tube length is measured from the extender-tube first end (122) to the extender-tube second end (124).

In some embodiments, the system (100) comprises an evertable, flexible, elongate, tubular, pipe-liner (130) having a pipe-liner first end (132) and a pipe-liner second end (134). In some embodiments, a selectable pipe-liner length is measured from the pipe-liner first end (132) to the pipe-liner second end (134).

In some embodiments, the system (100) comprises a substantially leak-proof pressure retaining closure-sleeve (140) located on the pipe-liner second end (134).

In some embodiments, the extender-tube second end (124) is located onto the pipe-liner first end (132) via a substantially leak-proof connection there between. In some embodiments, the combined extender-tube (120) and the pipe-liner (130) form a single continuous evertable tube, hereinafter referred to as an extended liner (150) having the pressure retaining closure-sleeve (140) enclosing a pipe-liner second end (134).

Critical Feature: In some embodiments, the extender-tube length and the pipe-liner length are each chosen so that the pipe-liner (130) liner is caused to be accurately positioned within the pipe (110) upon eversion of the combined extender-tube (120) and the pipe-liner (130).

Critical Feature: In some embodiments, for installation, an extender-tube first end (122) is located within the pipe (110) at a selectable predetermined position from the pipe opening end (112).

In some embodiments, the combined extender-tube (120) and pipe-liner (130) are everted via fluid under pressure that has been introduced into an interior of the extended liner (150) to drive at least part of the eversion process progressively so that the extender-tube (120) is first to evert and drags the pipe-liner (130) through the extender-tube (120) so that the pipe-liner (130) then everts after the eversion of the extender-tube (120) is completed so that the pipe-liner (130) becomes positioned at a desired position in the pipe (110) via the selected predetermined extender-tube length, the selected predetermined pipe-liner length, and the placement of the extender-tube first end (122) within the pipe (110) at the selected predetermined position from the pipe opening end (112).

In some embodiments, a method of lining a pipe comprises the step of providing a pipe (110) having a pipe opening end (112) fluidly connected to a pipe interior wall (114); a flexible, substantially-impermeable, elongate, extender-tube (120) having an extender-tube first end (122) and an extender-tube second end (124). In some embodiments, a selectable extender-tube length is measured from the extender-tube first end (122) to the extender-tube second end (124); an evertable, flexible, elongate, tubular, pipe-liner (130) having a pipe-liner first end (132) and a pipe-liner second end (134). In some embodiments, a selectable pipe-liner length is measured from the pipe-liner first end (132) to the pipe-liner second end (134); and a substantially leak-proof pressure retaining closure-sleeve (140) located on the pipe-liner second end (134); In some embodiments, the extender-tube second end (124) is located onto the pipe-liner first end (132) via a substantially leak-proof connection there between. In some embodiments, the combined extender-tube (120) and the pipe-liner (130) form a single continuous evertable tube, hereinafter referred to as an extended liner (150) having the pressure retaining closure-sleeve (140) enclosing a pipe-liner second end (134).

In some embodiments, a method of lining a pipe comprises the step of choosing the extender-tube length so that the pipe-liner (130) is caused to be accurately positioned within the pipe (110) upon eversion into the pipe (110).

In some embodiments, a method of lining a pipe comprises the step of choosing the pipe-liner length so that the pipe-liner (130) is caused to be accurately positioned within the pipe (110) upon eversion into the pipe (110).

Critical Feature: In some embodiments, a method of lining a pipe comprises the step of placing the extender-tube first end (122) at a predetermined position within the pipe (110) from the pipe opening end (112) so that the pipe-liner (130) is caused to be accurately positioned within the pipe (110) upon eversion into the pipe (110).

In some embodiments, a method of lining a pipe comprises the step of everting the combined extender-tube (120) and pipe-liner (130) via fluid under pressure that has been introduced into an interior of the extended liner (150) to drive at least part of the eversion process progressively so that the extender-tube (120) is first to evert and drags the pipe-liner (130) through the extender-tube (120), the pipe-liner (130) then everts after the eversion of the extender-tube (120) is completed, and the pipe-liner (130) becomes positioned at a desired position in the pipe (110) via the selected predetermined extender-tube length, the selected predetermined pipe-liner length, and the placement of the extender-tube first end (122) within the pipe (110) at the selected predetermined position from the pipe opening end (112).

In some embodiments, a method of lining a pipe comprises the step of detaching the extender-tube (120) from the pipe-liner (130) and removing the extender-tube (120) from the pipe (110) being lined.

In some embodiments, a method of lining a pipe (110) comprises the step of providing a flexible, substantially-impermeable, elongate extender-tube (120), an evertable, flexible, elongate, tubular pipe-liner (130), and a substantially leak-proof pressure retaining closure-sleeve (140), so that the combined extender-tube (120) and pipe-liner (130) together with a substantially leak-proof connection between them form a single continuous evertable tube, hereinafter referred to as an extended liner (150) having the pressure retaining closure-sleeve (140) enclosing a distal end of the extended liner (150). In some embodiments, a length of the extender-tube (120) and a length of the pipe-liner (130) are chosen so that the pipe-liner (130) is caused to be accurately positioned within the pipe (110) with one or both of the ends of the pipe-liner (130) placed at predetermined positions. In some embodiments, the extended liner (150) is loaded into a launch chamber having an outlet aperture through which a proximal end of the extended liner (150) or the extender-tube (120) is passed and everted.

In some embodiments, a method of lining a pipe (110) comprises the step of everting a proximal end of the extended liner (150) at a predetermined position within the pipe (110) from the pipe opening end (112).

In some embodiments, a method of lining a pipe (110) consisting of the step of everting the combined extender-tube (120) and pipe-liner (130) using fluid under pressure introduced into an interior of the extended liner (150) and an interior of the launch chamber to drive at least part of the eversion process progressively so that the extender-tube (120) is first to evert and drags the pipe-liner (130) through the extender-tube (120), and so that the pipe-liner (130) then everts after the eversion of the extender-tube (120) is completed, so that the pipe-liner (130) becomes positioned at a desired position in the pipe (110) being lined via the predetermined length of the extender-tube (120), the predetermined length of the pipe-liner (130), and the everting of the proximal end of the extended liner (150) at the predetermined position within the pipe (110) from the pipe opening end (112).

In some embodiments, a method of lining a pipe (110) comprises the step of detaching the extender-tube (120) from the pipe-liner (130) and removing the extender-tube (120) from the pipe (110) being lined.

In some embodiments, a method of lining a pipe (110) comprises the step of providing a flexible, substantially-impermeable, elongate extender-tube (120), and an evertable, flexible, elongate, tubular pipe-liner (130), so that the combined extender-tube (120) and pipe-liner (130) together with a substantially leak-proof connection between them form a single continuous evertable tube, hereinafter referred to as an extended liner (150). In some embodiments, a length of the extender-tube (120) and a length of the pipe-liner (130) are chosen so that the pipe-liner (130) is caused to be accurately positioned within the pipe (110) with one or both of the ends of the pipe-liner (130) placed at predetermined positions. In some embodiments, the extended liner (150) is loaded into a launch chamber having an outlet aperture through which a proximal end of the extended liner (150) or the extender-tube (120) is passed and everted.

In some embodiments, a method of lining a pipe (110) comprises the step of everting a proximal end of the extended liner (150) at a predetermined position within the pipe (110) from a pipe opening end (112).

In some embodiments, a method of lining a pipe (110) comprises the step of everting the combined extender-tube (120) and pipe-liner (130) using fluid under pressure introduced into an interior of the extended liner (150) and an interior of the launch chamber to drive at least part of the eversion process progressively so that the extender-tube (120) is first to evert and drags the pipe-liner (130) through the extender-tube (120), and so that the pipe-liner (130) then everts after the eversion of the extender-tube (120) is completed, so that the pipe-liner (130) becomes positioned at a desired position in the pipe (110) being lined via a predetermined length of the extender-tube (120), a predetermined length of the pipe-liner (130), and the everting of the proximal end of the extended liner (150) at the predetermined position within the pipe (110) from the pipe opening end (112).

In some embodiments, a method of lining a pipe (110) comprises the step of detaching the extender-tube (120) from the pipe-liner (130) and removing the extender-tube (120) from the pipe (110) being lined.

In some embodiments, the pipe-liner (130) comprises a tube of an absorbent material impregnated with a hardenable fluid and the method includes the step, after the everting step, of allowing the hardenable fluid to harden.

In some embodiments, the method of lining a pipe (110) includes the step of supporting the fully everted pipe-liner (130) against an inner surface of the pipe (110) being lined while the hardenable fluid is hardening.

In some embodiments, the method of lining a pipe (110) includes the step of positioning a pressure-tube of a flexible material within the pipe-liner (130) and filling the pressure-tube with fluid under pressure so that the pressure-tube presses the pipe-liner (130) against the inner surface of the pipe (110) being lined.

In some embodiments, the method of lining a pipe (110) includes the step of substantially hermetically sealing the pressure-tube during the supporting step so that the pressure-tube retains the fluid therein without substantial leakage or loss of pressure while the hardenable fluid is hardening.

In some embodiments, the method of lining a pipe (110) includes the step of positioning the pressure-tube within the pipe-liner (130) comprising the steps of attaching a first end of the pressure-tube to the pipe-liner second end (134) so that the pressure-tube is dragged into the pipe-liner (130) as the pipe-liner (130) everts and during the step of filling the pressure-tube with fluid under pressure, allowing the first end of the pressure-tube to evert so that the pressure-tube presses the pipe-liner (130) against the inner surface of the pipe (110) being lined along substantially the entire length of the pipe-liner (130).

In some embodiments, the method of lining a pipe (110) includes the step of attaching the extender-tube (120) to the pipe-liner (130) comprising the step of attaching an intermediate sleeve that is capable of being everted between the pipe-liner first end (132) and to the extender-tube second end (124).

In some embodiments, the intermediate sleeve is elastic.

In some embodiments, the intermediate sleeve is impermeable.

In some embodiments, the substantially leak-proof pressure retaining closure-sleeve (140) encloses a distal end of the extended liner (150).

In some embodiments, the method includes the step of providing a flexible, elongate, tubular pipe-liner (130) that has first and second ends and that is capable of being everted.

In some embodiments, the method includes the step of providing a flexible, substantially-impermeable, elongate extender-tube (120) that has first and second ends and that is capable of being everted.

In some embodiments, the method includes the step of attaching the extender-tube second end (124) to the pipe-liner first end (132) so that the combined extender-tube (120) and pipe-liner (130) form a continuous tubular construction that is substantially leak-proof between the extender-tube first end (122) and the pipe-liner second end (134).

In some embodiments, the method includes the step of everting the combined extender-tube (120) and pipe-liner (130) using fluid under pressure to drive at least part of the eversion process progressively so that the extender-tube (120) is first to evert and drags the pipe-liner (130) through the extender-tube (120) and so that the pipe-liner (130) then everts after the eversion of the extender-tube (120) is completed so that the pipe-liner (130) becomes positioned at a desired position in the pipe (110) being lined.

In some embodiments, the method includes the step of detaching the extender-tube (120) from the pipe-liner (130) and removing the extender-tube (120) from the pipe (110) being lined.

In some embodiments, the pipe-liner (130) comprises a tube of an absorbent material impregnated with a hardenable fluid and the method includes the step, after the everting step, of allowing the hardenable fluid to harden.

In some embodiments, the method includes the step of supporting the fully everted pipe-liner (130) against an inner surface of the pipe (110) being lined while the hardenable fluid is hardening.

In some embodiments, the method includes the step of positioning a pressure-tube of a flexible material within the pipe-liner (130) and filling the pressure-tube with fluid under pressure so that the pressure-tube presses the pipe-liner (130) against the inner surface of the pipe (110) being lined.

In some embodiments, the method includes the step of substantially hermetically sealing the pressure-tube prior to or during the supporting step.

In some embodiments, the method includes the step of positioning the pressure-tube within the pipe-liner (130) comprising the steps of inverting the first end of the pressure-tube; attaching the invert end of the pressure-tube to the pipe-liner second end (134) so that the pressure-tube is dragged into the pipe-liner (130) as the pipe-liner (130) everts; and during the step of filling the pressure-tube with fluid under pressure, allowing the first end of the pressure-tube to evert so that the pressure-tube presses the pipe-liner (130) against the inner surface of the pipe (110) being lined along substantially the entire length of the pipe-liner.

In some embodiments, the method includes the step of attaching the extender-tube (120) to the pipe-liner (130) comprising the step of attaching an intermediate sleeve that is capable of being everted between the pipe-liner first end (132) and to the extender-tube second end (124).

In some embodiments, the intermediate sleeve is elastic.

In some embodiments, the intermediate sleeve is impermeable.

In some embodiments, a method of lining a pipe comprises the step of providing a flexible, substantially-impermeable, elongate extender-tube (120), an evertable, flexible, elongate, tubular pipe-liner (130), and a substantially leak-proof pressure retaining closure-sleeve (140), so that the combined extender-tube (120) and pipe-liner (130) together with a substantially leak-proof connection between them form a single continuous evertable tube, hereinafter referred to as an extended liner (150) having the pressure retaining closure-sleeve (140) enclosing a distal end of the extended liner (150). In some embodiments, a length of the extender-tube (120) and a length of the pipe-liner (130) are chosen so that the pipe-liner (130) is caused to be accurately positioned within the pipe (110) with one or both of the ends of the liner placed at predetermined positions. In some embodiments, the extended liner (150) is loaded into a launch chamber having an outlet aperture through which a proximal end of the extended liner (150) or the extender-tube (120) is passed and everted.

In some embodiments, the method includes the step of everting a proximal end of the extended liner (150) at a predetermined position within the pipe (110) from a pipe opening end (112).

In some embodiments, the method includes the step of everting the combined extender-tube (120) and pipe-liner (130) using fluid under pressure introduced into an interior of the extended liner (150) and an interior of the launch chamber to drive at least part of the eversion process progressively so that the extender-tube (120) is first to evert and drags the pipe-liner (130) through the extender-tube (120) and so that the pipe-liner (130) then everts after the eversion of the extender-tube (120) is completed, so that the pipe-liner (130) becomes positioned at a desired position in the pipe (110) being lined via the predetermined length of the extender-tube (120), the predetermined length of the pipe-liner (130), and the everting of the proximal end of the extended liner (150) at the predetermined position within the pipe (110) from the pipe opening end (112).

In some embodiments, the method includes the step of detaching the extender-tube (120) from the pipe-liner (130) and removing the extender-tube (120) from the pipe (110) being lined.

Discussion of features in comparison to U.S. Pat. No. 6,199,591, Kiest et al. prior art.

The feature of a pressure retaining closure-sleeve (140) enclosing a distal end of the extended liner is critical in this invention because the pressurizing fluid is inserted into an inside of the pre-everted liner which requires a pressure retaining closure-sleeve (140) to hold pressure. This is a contrast to the Kiest prior art with a fully open liner having no closure-sleeve (140). The Kiest prior art does not have the feature of a pressure retaining closure-sleeve (140) enclosing a distal end of the liner. In fact, this prior art does not have any component equivalent to the feature of a pressure retaining closure-sleeve (140) enclosing a distal end of the liner. At most, this prior art has a fully open liner with no closure-sleeve (140), which cannot achieve the critical function of the feature of a pressure retaining closure-sleeve (140) enclosing a distal end of the liner in the presently claimed invention.

The feature of a length of the extender-tube and a length of the liner are chosen so that the liner is be caused to be accurately positioned within the pipe is critical in this invention because the present invention can place the liner from a single access opening by using predetermined lengths of the extender-tube and liner in contrast to the Kiest invention which is drug into position with a rope or cord. The Kiest prior art does not have the feature of a length of the extender-tube and a length of the liner are chosen so that the liner is be caused to be accurately positioned within the pipe. In fact, this prior art does not have any component equivalent to the feature of a length of the extender-tube and a length of the liner are chosen so that the liner is be caused to be accurately positioned within the pipe. At most, this prior art has a length that is not critical in determining placement of the liner, which cannot achieve the critical function of the feature of a length of the extender-tube and a length of the liner are chosen so that the liner is be caused to be accurately positioned within the pipe in the presently claimed invention.

The feature of everting the combined extender-tube (120) and pipe-liner (130) using fluid under pressure introduced into an interior of the extended liner (150) and an interior of the launch chamber is critical in this invention because using a sealed, pressurized liner for everting takes fewer components than Keist which uses an fully open liner that never comes in contact with the fluid used for pressurization. The Kiest prior art does not have the feature of everting the combined extender-tube (120) and pipe-liner (130) using fluid under pressure introduced into an interior of the extended liner (150) and an interior of the launch chamber. In fact, this prior art does not have any component equivalent to the feature of everting the combined extender-tube (120) and pipe-liner (130) using fluid under pressure introduced into an interior of the extended liner (150) and an interior of the launch chamber. At most, this prior art has a component that is pressurized, but that component is not the combined extender-tube (120) and pipe-liner, rather, the Kiest liner remains fully open and unpressurizeable, which cannot achieve the critical function of the feature of everting the combined extender-tube (120) and pipe-liner (130) using fluid under pressure introduced into an interior of the extended liner (150) and an interior of the launch chamber in the presently claimed invention.

Further, additional features of distinction may be summarized as the leak-proof join between the extender-tube (120) and the pipe-liner (130), the method whereby the extender-tube (120) and pipe-liner (130) are caused to evert, and the movement of the extender-tube (120) and the pipe-liner (130) towards the point where they evert.

Figure 9:
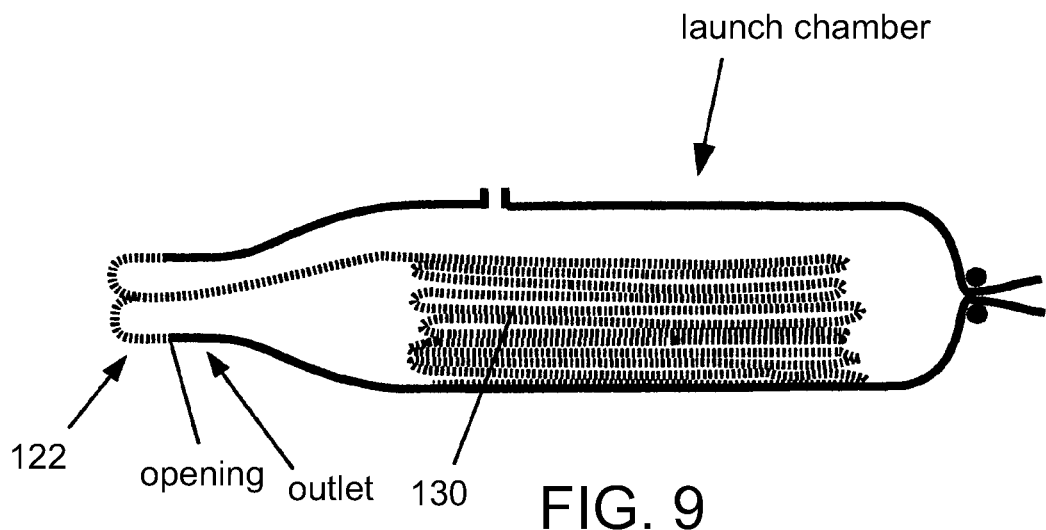
FIG. 9 shows a longitudinal sectional view of the launch chamber and the extended liner loaded therein of the present invention.
Figure 10:
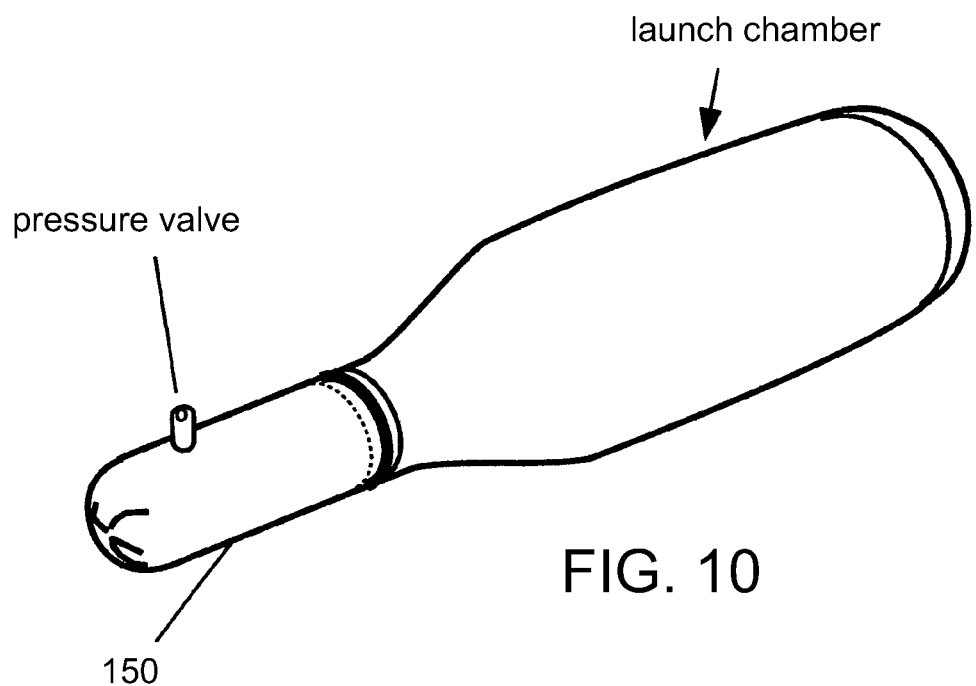
FIG. 10 shows the extender-tube emerging from the launch chamber of the present invention.
Figure 11:
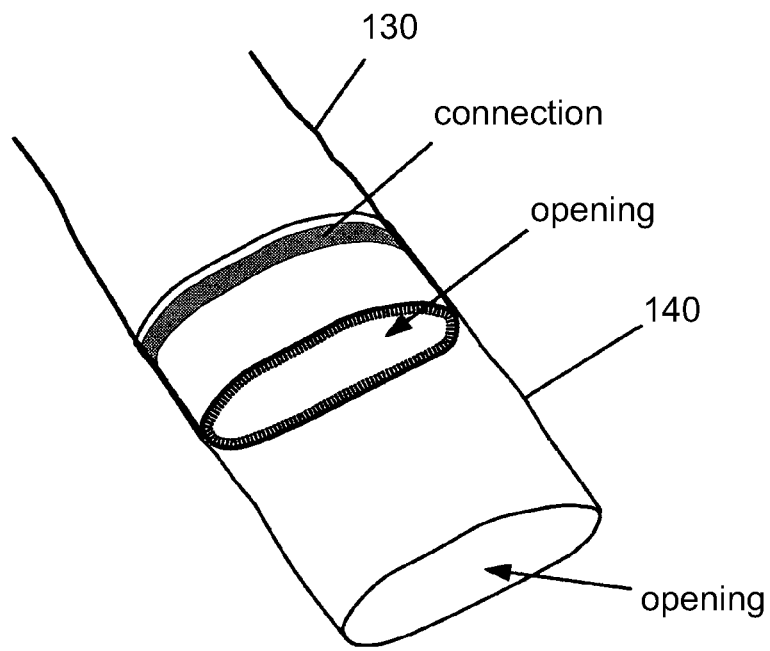
FIG. 11 shows a view of a closure-sleeve fitted around the pipe-liner of the present invention.
Figure 12:
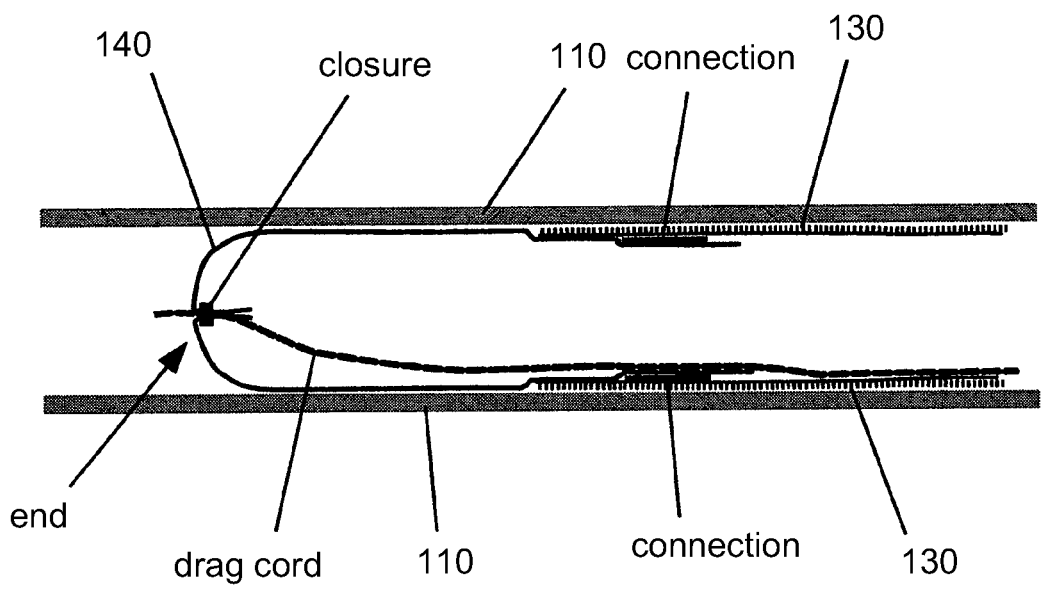
FIG. 12 shows a longitudinal sectional view of the pipe-liner and the closure-sleeve.
Figure 13:
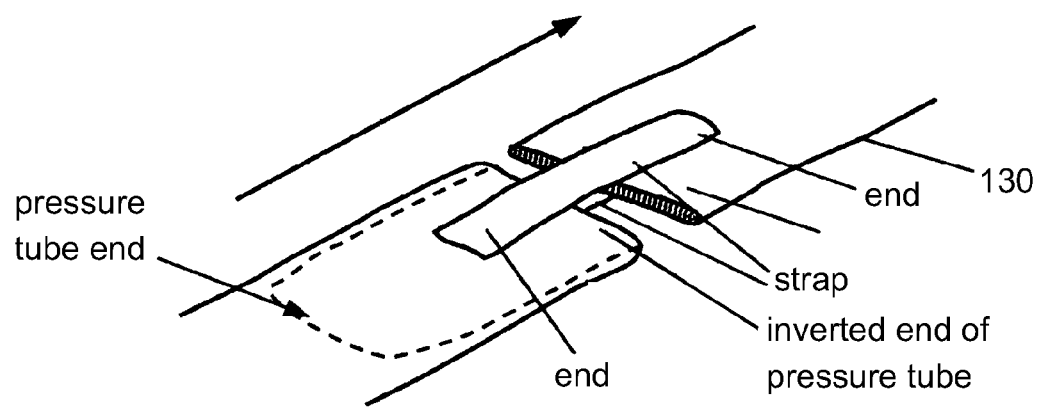
FIG. 13 shows an end of the pipe-liner connected to a pressure tube of the present invention.
Figure 14:
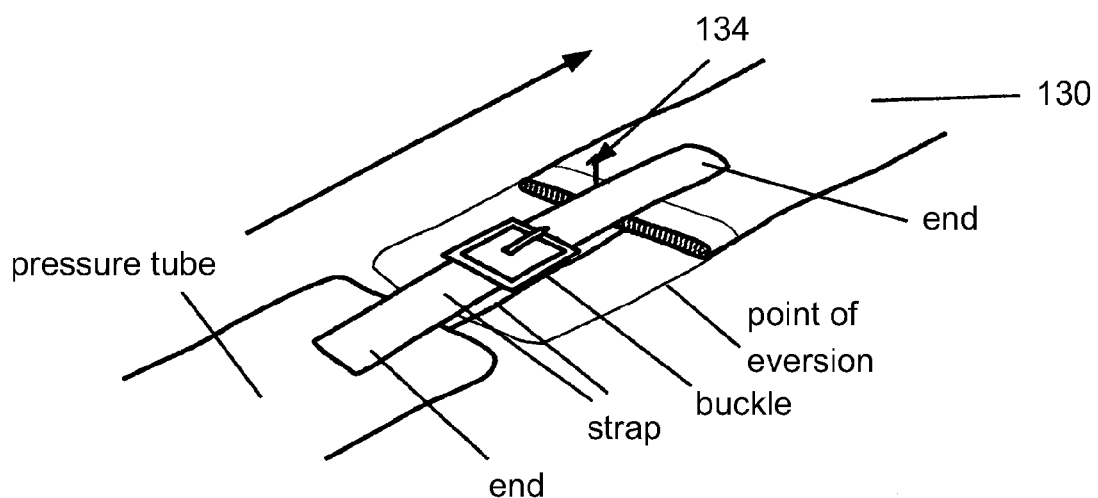
FIG. 14 shows an end of the pipe-liner attached to a pressure tube of the present invention.
Figure 15:
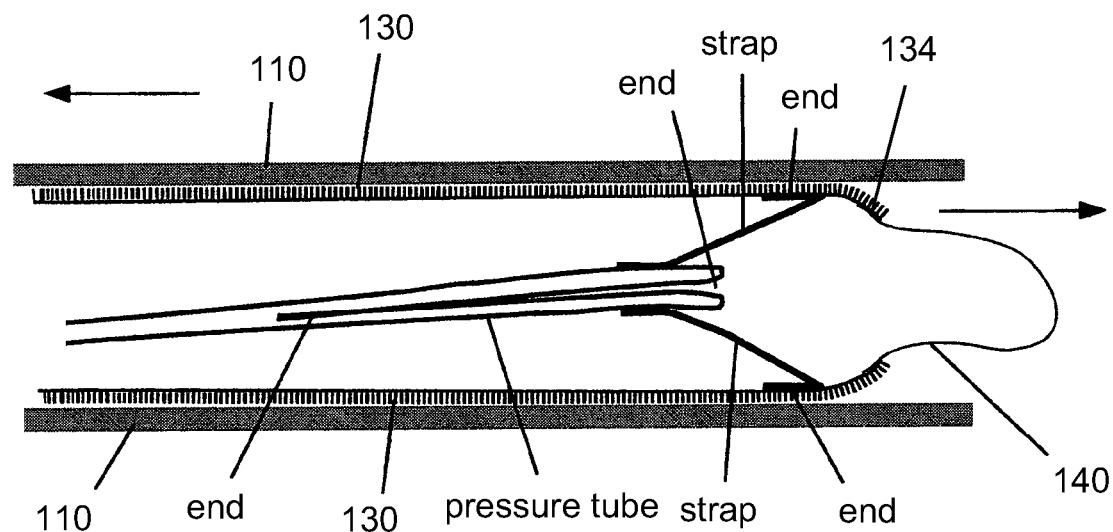
FIG. 15 shows a pipe-liner almost fully inverted into a pipe of the present invention.
Figure 16:
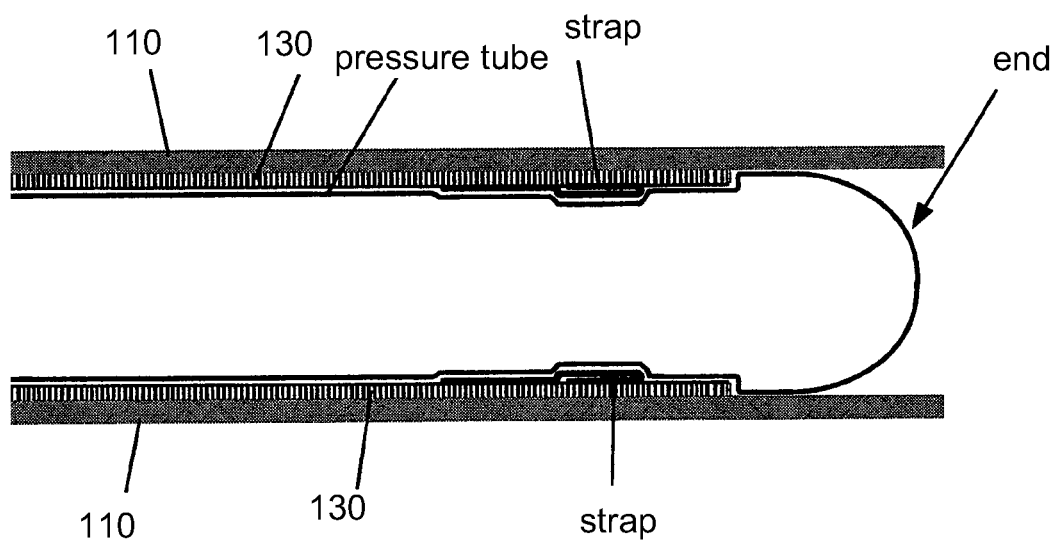
FIG. 16 shows a longitudinal sectional view of a pipe-liner that is inverted into a pipe and held static via a pressure tube of the present invention.
Figure 17:
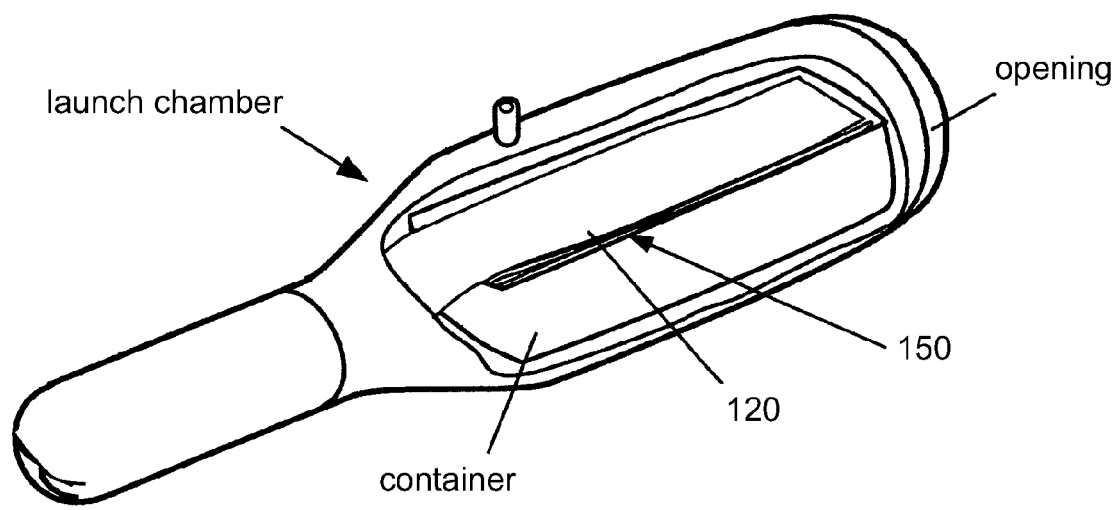
FIG. 17 shows a view of the launch chamber having a cut-away section showing the extended liner placed in a container of the present invention.
Figure 18:
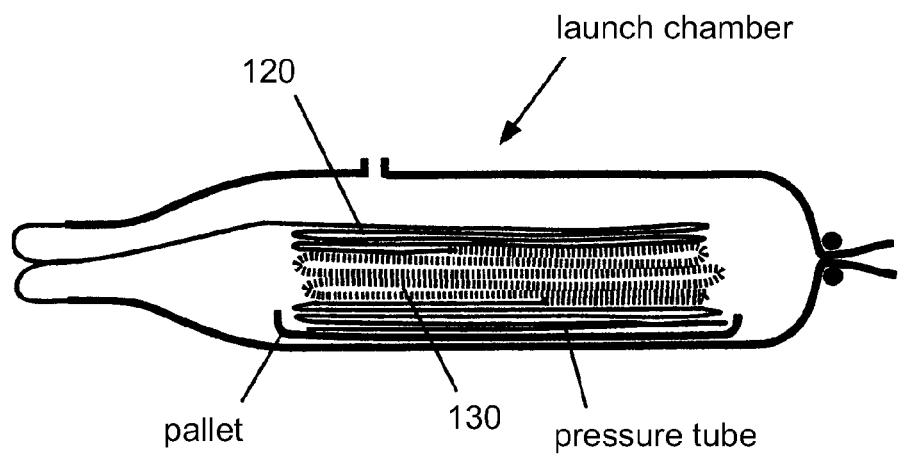
FIG. 18 shows a longitudinal section view of the extender-tube and a pipe-liner to which a pressure tube of the present invention is attached.
Figure 19:
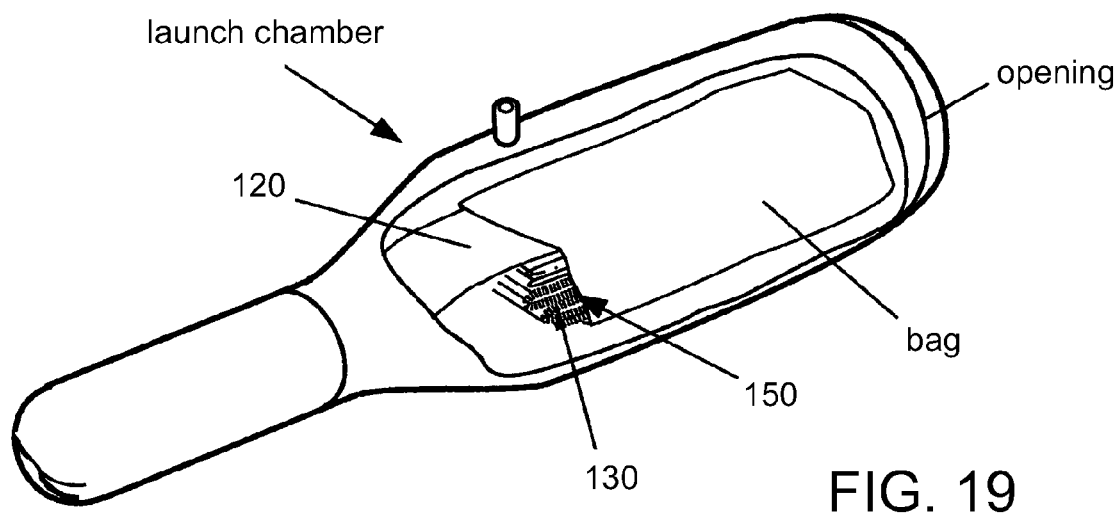
FIG. 19 shows a view of the launch chamber having a cut-away section showing the extended liner placed in a bag of the present invention
Figure 20:
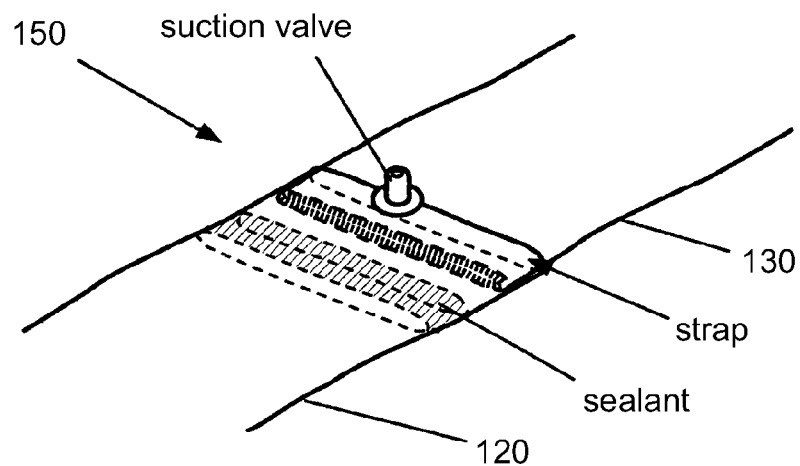
FIG. 20 shows a close-up view of the pipe-liner connected to the extender-tube.
Figure 21:
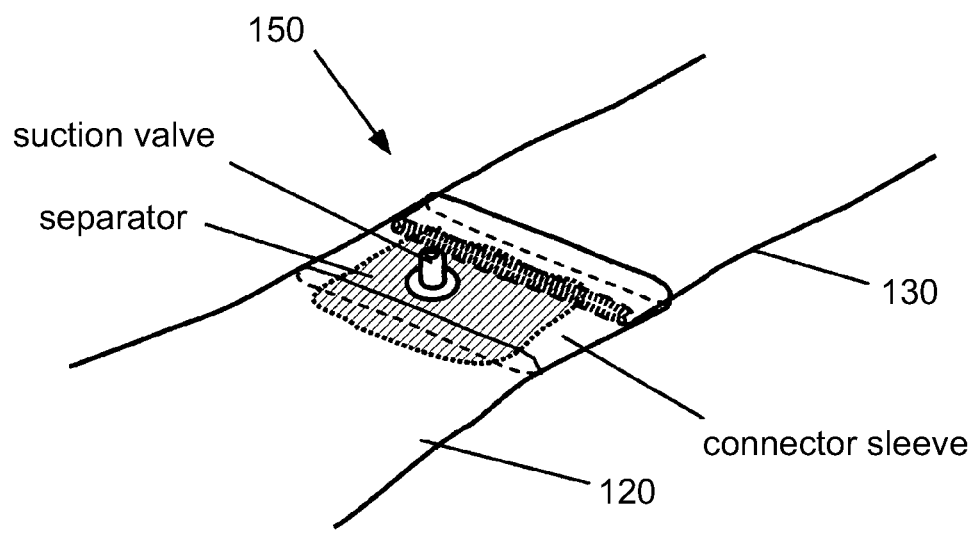
FIG. 21 shows a close-up view of the pipe-liner connected to the extender-tube via a connector sleeve.
Figure 22:
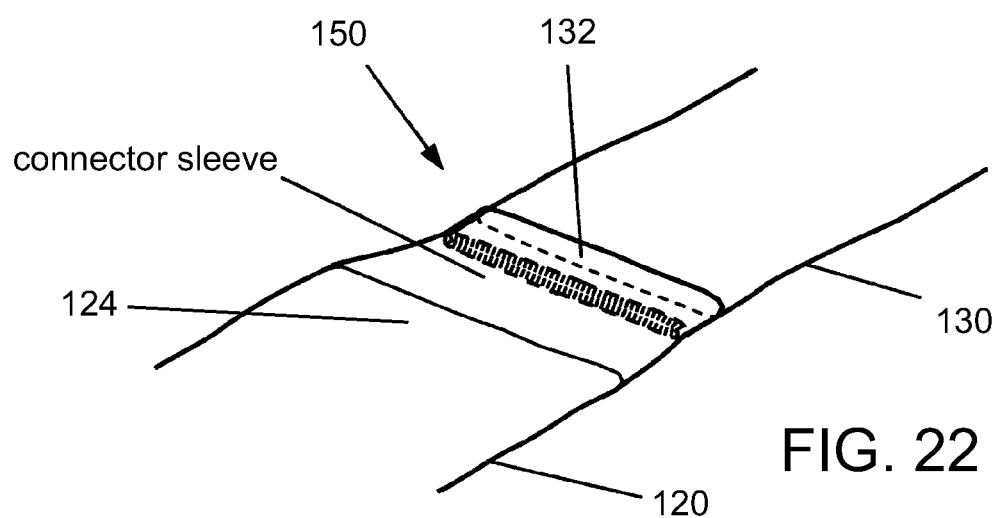
FIG. 22 shows a close-up view of the pipe-liner connected to the extender-tube via a tapered connector sleeve.
Figure 23:
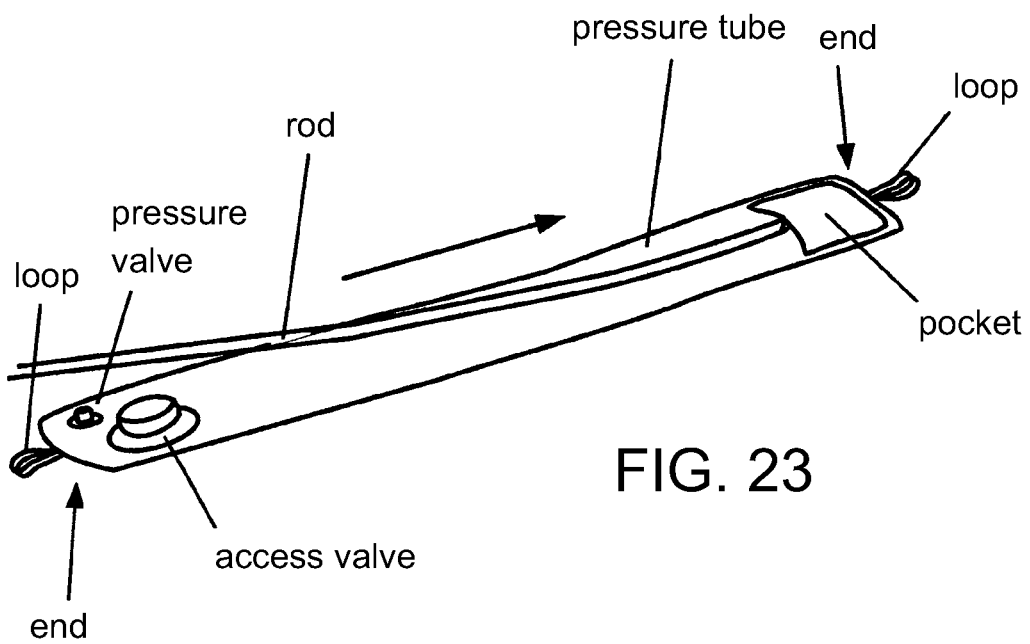
FIG. 23 shows a pressure tube of the present invention.

FIG. 9 of U.S. Pat. No. 6,199,591, Kiest et al. shows one end of the device designed by Kiest et al for installing a section of liner at a pre-determined position within a sewer. On the left there is a pair of end-flaps through which is threaded a cable which is used to haul the device into place within a sewer. The other parts depicted in FIG. 9, are for use once the device has been positioned inside the sewer. An outer carrier tube 82 (col 8, line 29) is shown, integrally formed with a bladder tube (col 8, line 30) with a juncture between the two at a fold (col 8, line 37). An inversion collar is spot welded or otherwise attached to the forward end of bladder tube and extends rearwardly therefrom. At its rear end it is attached to a repair sleeve by means of threads (col 8, lines 41 to 44 verbatim).

Figure 5:
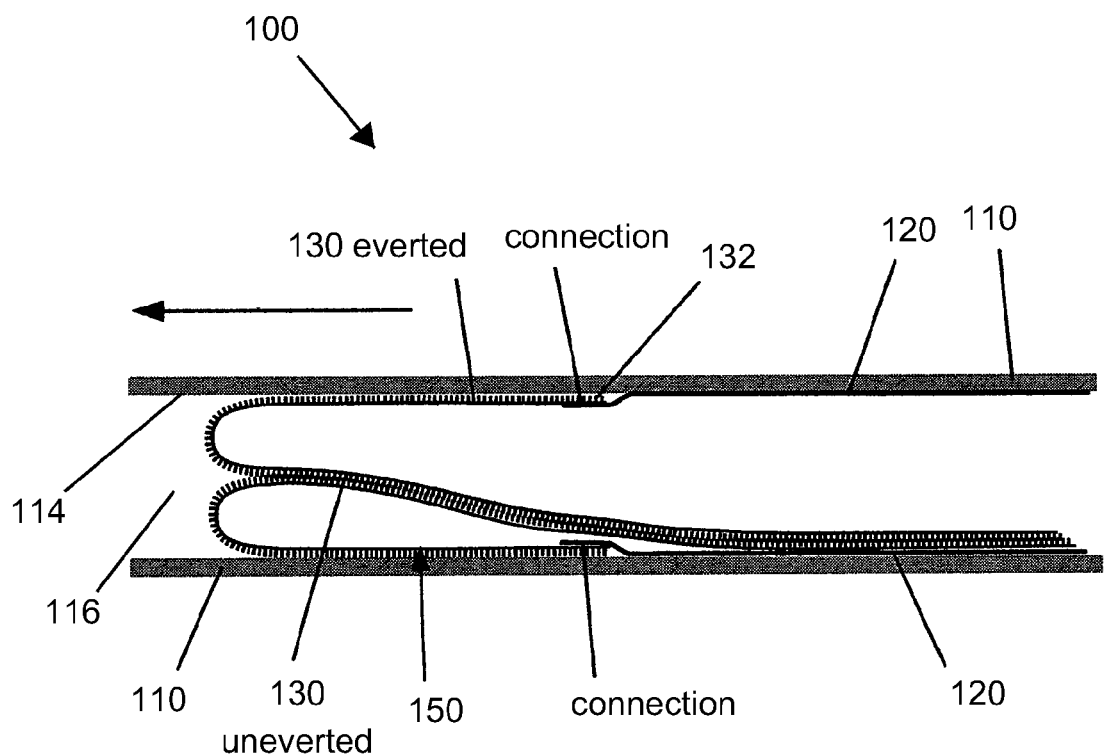
FIG. 5 shows a longitudinal sectional view of the extended liner of the present invention during eversion.
Figure 6:
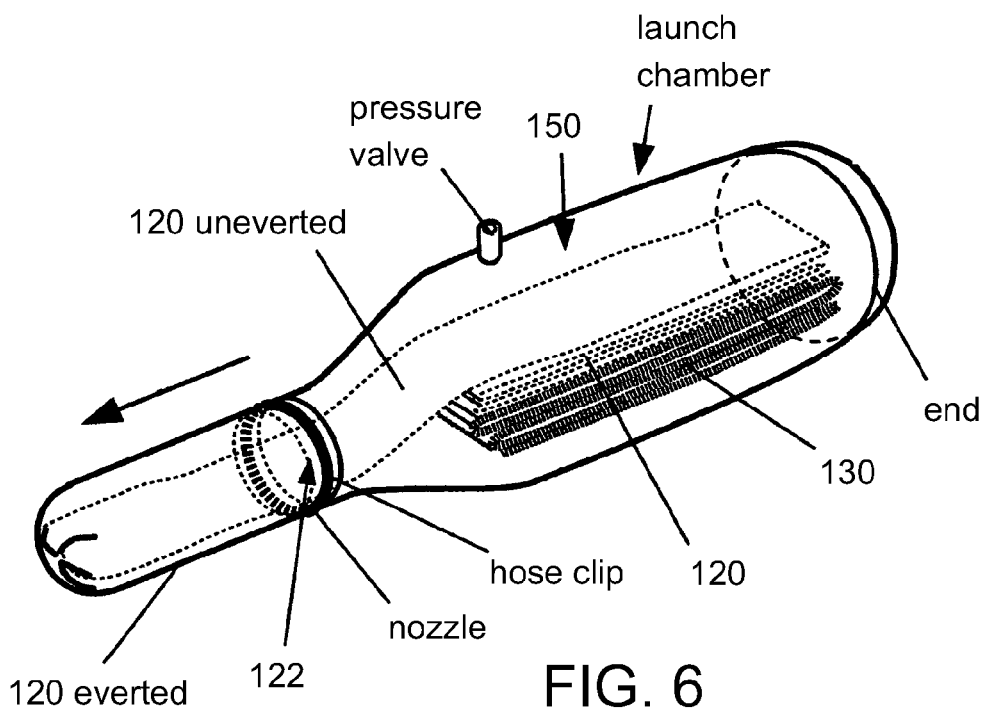
FIG. 6 shows a launch chamber in use with the extended liner of the present invention during eversion.
Figure 7:
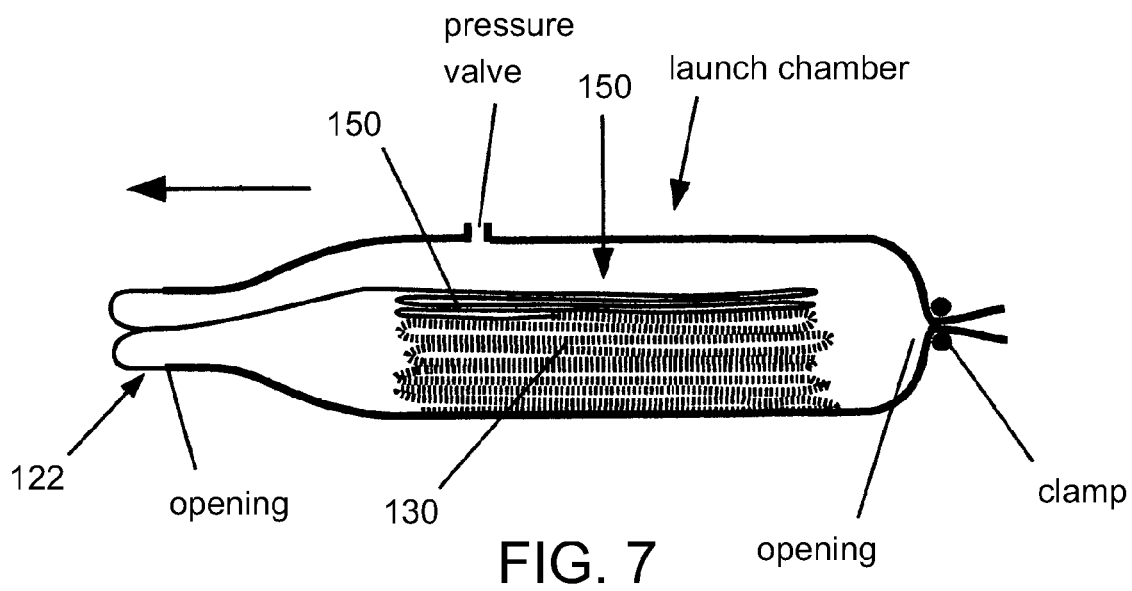
FIG. 7 shows a longitudinal sectional view of the launch chamber and the extended liner loaded therein of the present invention.
Figure 8:
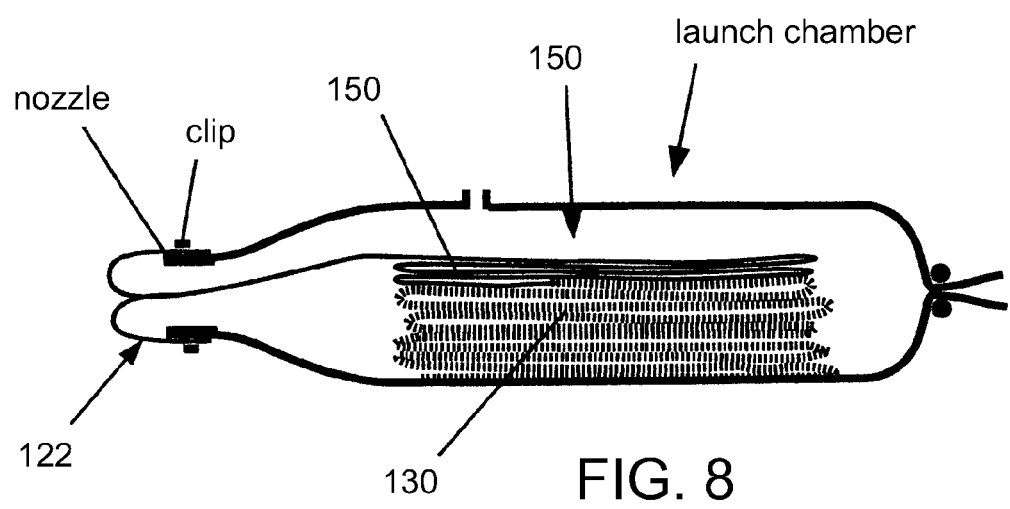
FIG. 8 shows a longitudinal sectional view of the launch chamber and the extended liner loaded therein of the present invention.

Not labelled in FIG. 9 but identified in FIG. 5 of U.S. Pat. No. 6,199,591, Kiest et al. is the carrier cavity (col 6, line 44) which is referred to again in relation to FIG. 11 of U.S. Pat. No. 6,199,591, Kiest et al. (col 7, line 58), though it is also not actually marked on the FIG. 11 drawing. Although not explicitly shown in FIG. 9, the bladder tube is closed hermetically at the unseen end (see FIGS. 6, 7 and 8 of U.S. Pat. No. 6,199,591, Kiest et al. and reference to plug in col 9, line 28), so any fluid introduced into the carrier cavity will be retained between the outer carrier tube and the bladder tube and, since fold is the only unconstrained part of the enclosure of the carrier cavity, pressurizing it will cause the bladder tube to evert. At the same time, pressure within the carrier cavity will cause the bladder tube to collapse around the inversion collar and the repair sleeve and will drive out any air that is in the space that encloses them. The repair sleeve and the inversion collar are pressed within and gripped by the enclosing bladder tube so that they advance exactly together with it towards the point where they are carried round on the outside of the everting part of the bladder tube and, having been everted, are then pressed against the inner surface of the pipe being lined. During this process, the pressurizing fluid is at all times held within the carrier cavity and the inversion collar and the repair sleeve are both positioned on the other side of the containing wall of the bladder tube; they do not come into contact with the pressurizing fluid at any time and the join that connects them is not subjected to any potentially destructive stress during the process. There is therefore no requirement for the join to be leak-proof or for it to be strengthened to withstand being everted and the purposely breakable connection formed of threads is sufficient for the purpose of ensuring that the repair sleeve follows the inversion collar and everts satisfactorily.

Kiest et al. explains the eversion process in the following terms, all of which describe the bladder tube as the prime component being inverted (everted), resulting in the repair sleeve/liner being placed in the desired position in the pipe being lined: Abstract: "The bladder tube can be inverted out of the carrier tube so as to place the repair sleeve in contact with an area to be repaired within a sewer pipe.", Column 2, lines 55 to 61: " . . . the positioning element then being inserted into an existing pipe and fluid being introduced under pressure into the positioning element to cause the inflation bladder and the liner secured thereto to invert outwardly from within the positioning element to a placement position near the compromised pipe section . . . ", Column 3, lines 41 to 45: "When the carrier is located next the area in the pipeline to be repaired, the bladder tube is inverted out of the carrier tube and this places the resin impregnated material in contact with the sewer walls needing repair.", Column 7, lines 56 to 62: "When the carrier tube reaches the position shown in FIG. 11, air pressure, water pressure or other fluid pressure is applied to the carrier cavity. This causes the bladder tube to begin to invert out of the carrier tube in the manner illustrated in FIG. 12. The inversion of the bladder tube continues until it reaches the position shown in FIG. 13. In this position the repair sleeve is on the outside of the bladder tube and is in engagement with the area of pipe which requires repair."

FIG. 5 of U.S. Pat. No. 6,199,591, Kiest et al. shows an alternative form of the Kiest device. It is very similar to the device depicted in FIG. 9 except that a set of rigid collars and rings is used for clamping some of the main components together. A serrated collar and an outer clamp, trap and hold in position the rear ends of the end flaps and the forward end of the carrier tube. The forward end of bladder tube is folded back over the forward end of collar and secured with a clamp. Although part of bladder tube is depicted as touching the inner surface of collar, these two components are not attached and, as in FIG. 9, the carrier cavity extends forward of collar and thus the bladder tube is capable of eversion and carrying and everting the inversion collar and the repair sleeve in the same manner as in FIG. 9.

Some of the workings of the Kiest device can be seen at http://vimeo.com/48085881. The relevant segments start at 02.43 with the assembled device being loaded from a truck into a flexible tube that seems to serve as a protector and guide for inserting it into a manhole. At 03.08 the device is shown being dragged within a pipe. The circular appearance indicates that it is the FIG. 5 version, with a rigid collar. The commencement of eversion is at 03.13 but the following few seconds, which include both the emergence and the withdrawal of the inner bladder, pass too quickly for one to get a clear picture of what is going on.

Thus, the combination of an inversion collar connected to a repair sleeve as described by Kiest et al. in U.S. Pat. No. 6,199,591 differs from the combined extender-tube (120) and pipe-liner (130) that forms a continuous, substantially leak-proof tubular construction that is claimed in the present invention because it is not and is not described as being substantially leak-proof. The method of attachment of the inversion collar to the repair sleeve is described as being by threads or stitches that are easily broken and they are depicted as loose, looping above the surface of the materials being attached. If used on the device in the present invention, such a connection would fail to retain the pressures used to drive eversion and even minor leakage holes would cause loss of pressure sufficient to halt the process.

In U.S. Pat. No. 6,199,591, Kiest et al. consistently describe the pressurization and eversion process in terms of the behavior of the bladder tube and barely touch on the behavior of the eversion collar and the repair sleeve other than to say that the repair sleeve is secured to the bladder and is placed against the damaged part of the pipe being lined. It is clear that the carrier cavity, bounded by the bladder tube and the outer carrier tube, fully encloses the pressurizing fluid and that the repair sleeve and the inversion collar lie outside it and so do not come into contact with the pressurizing fluid. Thus the eversion of the repair sleeve and the inversion collar is driven by the eversion of the bladder tube and there is no need for the join between the two components to be leak-proof or for it to be strong. In contrast, there is no intermediate bladder in the present invention that takes the load due to the fluid pressure and separates the liner and the extender-tube (120) from the pressurizing fluid and the join between them is therefore required to be substantially leak-proof and strong enough to withstand the process of eversion without loss of pressure.

As explained above, prior to eversion, the repair sleeve and inversion collar in the Kiest device (pipe-liner (130) and extender-tube (120) in the present invention) are held within the uneverted section of the bladder tube which, when subjected to pressure, collapses tightly round them so that there is no possibility that they might be caused to move independent of the bladder tube by a dragging force applied to one end. Then, as the bladder tube everts, the repair sleeve and inversion collar are carried forwards by the motion of the bladder tube, the force being exerted on the repair sleeve frictionally along its entire length, not as a dragging force exerted by the inversion collar. In contrast, the device in the present invention relies on dragging forces exerted directly on the extender-tube (120) and liner from the point where they evert and, unlike the Kiest device, requires joins capable of withstanding such forces.

In some embodiments, a method of lining a pipe comprises the step of providing a flexible, elongate, tubular pipe-liner (130) that has first and second ends and that is capable of being everted, providing a flexible, substantially-impermeable, elongate extender-tube (120) that has first and second ends and that is capable of being everted, attaching the extender-tube second end (124) to the pipe-liner first end (132) so that the combined extender-tube (120) and pipe-liner (130) form a continuous tubular construction that is substantially leak-proof between the extender-tube first end (122) and the pipe-liner second end (134).

In some embodiments, a method of lining a pipe comprises the step of everting the combined extender-tube (120) and pipe-liner (130) using fluid under pressure to drive at least part of the eversion process progressively so that the extender-tube (120) is first to evert and drags the pipe-liner (130) through the extender-tube (120), and so that the pipeliner then everts after the eversion of the extender-tube (120) is completed, so that the pipe-liner (130) becomes positioned at a desired position in the pipe being lined, and detaching the extender-tube (120) from the pipe-liner (130) and removing the extender-tube (120) from the pipe being lined.

In some embodiments, the pipe-liner (130) comprises a tube of an absorbent material impregnated with a hardenable fluid, and the method includes the step, after the everting step, of allowing the hardenable fluid to harden.

In some embodiments, the method further includes the step of supporting the fully everted pipe-liner (130) against an inner surface of the pipe being lined while the hardenable fluid is hardening.

In some embodiments, the supporting step includes the steps of positioning a pressure-tube (35) of a flexible material within the pipe-liner (130), and filling the pressure-tube with fluid under pressure so that the pressure-tube presses the pipe-liner (130) against the inner surface of the pipe being lined.

In some embodiments, a method of lining a pipe comprises the step of substantially hermetically sealing the pressure-tube during the supporting step.

In some embodiments, a method of lining a pipe comprises the step of positioning the pressure-tube within the pipe-liner (130) comprising the steps of inverting the first end of the pressure-tube attaching the invert end of the pressure-tube to the pipe-liner second end (134) so that the pressure-tube is dragged into the pipe-liner (130) as the pipe-liner (130) everts, and during the step of filling the pressure-tube with fluid under pressure, allowing the first end of the pressure-tube to evert so that the pressure-tube presses the pipe-liner (130) against the inner surface of the pipe being lined along substantially the entire length of the pipe-liner.

In some embodiments, a method of lining a pipe comprises the step of attaching the extender-tube to the pipe-liner (130) comprising the step of attaching an intermediate sleeve (13) that is capable of being everted between the pipe-liner first end (132) and the extender-tube second end (124).

In some embodiments, the intermediate sleeve is elastic.

In some embodiments, the intermediate sleeve is impermeable.

In some embodiments, the extender-tube first end (122) is attached to the launch chamber. In some embodiments, the launch chamber is located exterior to the pipe interior cavity (116). In some embodiments, the combined extender-tube (120) and pipe-liner (130) is everted via the launch chamber using fluid under pressure introduced into the interior of the extended liner (150) and the interior of the launch chamber.

As used herein, the term "about" refers to plus or minus 10% of the referenced number.

The disclosures of the following U.S. Patents are incorporated in their entirety by reference herein: U.S. Pat. No. 6,177,591, Kiest et al. and U.S. Patent Pub. No. 2008/0236692, Kiest.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of lining a pipe comprising the steps of:
(a) providing a pipe (110) having a pipe opening end (112) fluidly connected to a pipe interior wall (114); a flexible, substantially-impermeable, elongate, extender-tube (120) having an extender-tube first end (122) and an extender-tube second end (124), wherein a selectable extender-tube length is measured from the extender-tube first end (122) to the extender-tube second end (124); an evertable, flexible, elongate, tubular, pipe-liner (130) having a pipe-liner first end (132) and a pipe-liner second end (134), wherein a selectable pipe-liner length is measured from the pipe-liner first end (132) to the pipe-liner second end (134); and a substantially leak-proof pressure retaining closure-sleeve (140) disposed on the pipe-liner second end (134); wherein the extender-tube second end (124) is disposed onto the pipe-liner first end (132) via a substantially leak-proof connection there between, wherein the combined extender-tube (120) and the pipe-liner (130) form a single continuous evertable tube, hereinafter referred to as an extended liner (150) having the pressure retaining closure-sleeve (140) enclosing a pipe-liner second end (134);
(b) choosing the extender-tube length so that the pipe-liner (130) is caused to be accurately positioned within the pipe (110) upon eversion into the pipe (110);
(c) choosing the pipe-liner length so that the pipe-liner (130) is caused to be accurately positioned within the pipe (110) upon eversion into the pipe (110);
(d) placing the extender-tube first end (122) at a predetermined position within the pipe (110) from the pipe opening end (112) so that the pipe-liner (130) is caused to be accurately positioned within the pipe (110) upon eversion into the pipe (110);
(e) everting the combined extender-tube (120) and pipe-liner (130) via fluid under pressure that has been introduced into an interior of the extended liner (150) to drive at least part of the eversion process progressively so that:
(i) the extender-tube (120) is first to evert and drags the pipe-liner (130) through the extender-tube (120),
(ii) the pipe-liner (130) then everts after the eversion of the extender-tube (120) is completed, and
(iii) the pipe-liner (130) becomes positioned at a desired position in the pipe (110) via the selected predetermined extender-tube length, the selected predetermined pipe-liner length, and the placement of the extender-tube first end (122) within the pipe (110) at the selected predetermined position from the pipe opening end (112); and
(f) detaching the extender-tube (120) from the pipe-liner (130) and removing the extender-tube (120) from the pipe (110) being lined.

2. A method of lining a pipe (110) comprising the steps of:
(a) providing a flexible, substantially-impermeable, elongate extender-tube (120), an evertable, flexible, elongate, tubular pipe-liner (130), and a substantially leak-proof pressure retaining closure-sleeve (140), so that the combined extender-tube (120) and pipe-liner (130) together with a substantially leak-proof connection between them form a single continuous evertable tube, hereinafter referred to as an extended liner (150) having the pressure retaining closure-sleeve (140) enclosing a distal end of the extended liner (150), wherein a length of the extender-tube (120) and a length of the pipe-liner (130) are chosen so that the pipe-liner (130) is caused to be accurately positioned within the pipe (110) with one or both of the ends of the pipe-liner (130) placed at predetermined positions, wherein the extended liner (150) is loaded into a launch chamber having an outlet aperture through which a proximal end of the extended liner (150) or the extender-tube (120) is passed and everted;
(b) everting a proximal end of the extended liner (150) at a predetermined position within the pipe (110) from the pipe opening end (112);
(c) everting the combined extender-tube (120) and pipe-liner (130) using fluid under pressure introduced into an interior of the extended liner (150) and an interior of the launch chamber to drive at least part of the eversion process progressively so that the extender-tube (120) is first to evert and drags the pipe-liner (130) through the extender-tube (120), and so that the pipe-liner (130) then everts after the eversion of the extender-tube (120) is completed, so that the pipe-liner (130) becomes positioned at a desired position in the pipe (110) being lined via the predetermined length of the extender-tube (120), the predetermined length of the pipe-liner (130), and the everting of the proximal end of the extended liner (150) at the predetermined position within the pipe (110) from the pipe opening end (112); and
(d) detaching the extender-tube (120) from the pipe-liner (130) and removing the extender-tube (120) from the pipe (110) being lined.

3. A method as claimed in claim 2, wherein the pipe-liner (130) comprises a tube of an absorbent material impregnated with a hardenable fluid, and the method includes the step, after the everting step, of allowing the hardenable fluid to harden.

4. A method as claimed in claim 3, further including the step of supporting the fully everted pipe-liner (130) against an inner surface of the pipe being lined while the hardenable fluid is hardening.

5. A method as claimed in claim 4, wherein the supporting step includes the steps of: positioning a pressure-tube (35) of a flexible material within the pipe-liner (130), and filling the pressure-tube with fluid under pressure so that the pressure-tube presses the pipe-liner (130) against the inner surface of the pipe being lined.

6. A method as claimed in claim 5, further including the step of: substantially hermetically sealing the pressure-tube during the supporting step.

7. A method as claimed in claim 2, wherein the extender-tube first end (122) is attached to the launch chamber, wherein the launch chamber is disposed exterior to the pipe interior cavity (116), wherein the combined extender-tube (120) and pipe-liner (130) is everted via the launch chamber using fluid under pressure introduced into the interior of the extended liner (150) and the interior of the launch chamber.

8. A lined pipe system comprising:
 (a) a pipe (110) having a pipe opening end (112) fluidly connected to a pipe interior wall (114);
 (b) a flexible, substantially-impermeable, elongate, extender-tube (120) having an extender-tube first end (122) and an extender-tube second end (124), wherein a selectable extender-tube length is measured from the extender-tube first end (122) to the extender-tube second end (124);
 (c) an evertable, flexible, elongate, tubular, pipe-liner (130) having a pipe-liner first end (132) and a pipe-liner second end (134), wherein a selectable pipe-liner length is measured from the pipe-liner first end (132) to the pipe-liner second end (134); and
 (d) a substantially leak-proof pressure retaining closure-sleeve (140) disposed on the pipe-liner second end (134);
wherein the extender-tube second end (124) is disposed onto the pipe-liner first end (132) via a substantially leak-proof connection there between, wherein the combined extender-tube (120) and the pipe-liner (130) form a single continuous evertable tube, hereinafter referred to as an extended liner (150) having the pressure retaining closure-sleeve (140) enclosing a pipe-liner second end (134);

wherein the extender-tube length and the pipe-liner length are each chosen so that the pipe-liner (130) liner is caused to be accurately positioned within the pipe (110) upon eversion of the combined extender-tube (120) and the pipe-liner (130);

wherein for installation, an extender-tube first end (122) is disposed within the pipe (110) at a selectable predetermined position from the pipe opening end (112);

wherein the combined extender-tube (120) and pipe-liner (130) can be everted via fluid under pressure that has been introduced into an interior of the extended liner (150) to drive at least part of the eversion process progressively so that the extender-tube (120) can first evert and drag the pipe-liner (130) through the extender-tube (120) so that the pipe-liner (130) can then evert after the eversion of the extender-tube (120) is completed so that the pipe-liner (130) becomes positioned at a desired position in the pipe (110) via the selected predetermined extender-tube length, the selected predetermined pipe-liner length, and the placement of the extender-tube first end (122) within the pipe (110) at the selected predetermined position from the pipe opening end (112).

\* \* \* \* \*